United States Patent
He et al.

(10) Patent No.: US 8,106,553 B2
(45) Date of Patent: Jan. 31, 2012

(54) SPINDLE MOTOR COMPONENT OF HARD DISK DRIVER WITH COMPOSITE COATING LAYER AND COMPOSITE COATING METHOD THEREOF

(75) Inventors: Jinzhou He, Sichuan (CN); Yan Dai, Sichuan (CN)

(73) Assignee: Chengdu Galaxy Magnets Co., Ltd., Chengdu, Sichuan (CN)

( * ) Notice: Subject to any disclaimer, the term of this patent is extended or adjusted under 35 U.S.C. 154(b) by 257 days.

(21) Appl. No.: 12/665,337

(22) PCT Filed: Mar. 7, 2008

(86) PCT No.: PCT/CN2008/070443
§ 371 (c)(1),
(2), (4) Date: Dec. 18, 2009

(87) PCT Pub. No.: WO2009/000170
PCT Pub. Date: Dec. 31, 2008

(65) Prior Publication Data
US 2010/0181874 A1      Jul. 22, 2010

(30) Foreign Application Priority Data
Jun. 22, 2007   (CN) .......................... 2007 1 0049351

(51) Int. Cl.
*H02K 5/10* (2006.01)

(52) U.S. Cl. ......................................... 310/88; 310/340

(58) Field of Classification Search .................. 310/88, 310/340, 90; 384/543, 490, 193, 261, 162, 384/226.27, 280.372, 397, 415, 416, 603; H02K 5/10
See application file for complete search history.

(56) References Cited

U.S. PATENT DOCUMENTS

| 5,451,306 A | 9/1995 | Nakamura et al. |
| 7,221,068 B2 * | 5/2007 | Yoshimura et al. ............. 310/45 |

FOREIGN PATENT DOCUMENTS

| CN | 1073754 C | 10/2001 |
| CN | 101114775 A | 1/2008 |

* cited by examiner

*Primary Examiner* — Quyen Leung
*Assistant Examiner* — Thomas Truong
(74) *Attorney, Agent, or Firm* — Mei & Mark LLP

(57) ABSTRACT

A spindle motor component of hard disk with composite coating layer and a composite coating method hereof. The spindle motor component of hard disk includes a motor component base (1) and the composite coating layer which is coated on the base (1). The composite coating layer consists of an electrodepositing coating layer (2) and a spraying coating layer (3). The composite coating method includes a step of coating the electrodepositing coating layer (2) on the surface of the motor component base (1) and coating the spraying coating layer (3) on the electrodepositing coating layer (2), wherein the weight ratio of tin in the electrodepositing coating layer (2) is between 60 ppm to 300 ppm and the weight ratio of tin in the spraying coating layer (3) is no more than 50 ppm.

2 Claims, 1 Drawing Sheet

SPINDLE MOTOR COMPONENT OF HARD DISK DRIVER WITH COMPOSITE COATING LAYER AND COMPOSITE COATING METHOD THEREOF

TECHNICAL FIELD

The present invention relates to a motor part with the surface thereof coated, and a method used for coating the motor part.

BACKGROUND ART

Presently, the anti-corrosion property of a magnet of a hard disk driver (HDD) spindle motor, a laminated core, or other parts is mainly realized through electrodepositing coating over the surface. The associated mechanism is to make use of the shielding function of coating to isolate the base from the surrounding environment so as to prevent the metal base covered by the coating layer from corrosion that would otherwise occur due to contacting with outside corrosive medium.

Generally, when a motor which is made of spindle motor parts with an electrodepositing coating layer is used in a hard disk driver, the storage content in the hard disk tends to lose, which is caused by adherence of tin and its compound released from the electrodepositing coating layer to the surface of the magnetic storage medium. Therefore tin content in the coating layers is conventionally regulated to a quite low level. For example, the patent No. CN1073754C, titled A Magnet and a motor part with an anti-corrosion coating layer and increased insulation, regulates tin content to a level of 50 ppm or even lower, i.e., the content of tin and its compound in the aqueous electrodepositing paint solution is equal to or lower than 12 ppm to the effect that the magnetic storage medium would not be damaged.

However, it is simply not easy in the electrodepositing process to regulate the tin content in the aqueous electrodepositing paint solution to the level of 12 ppm or even lower since tin and its compound may be contained in impurities of raw materials. In other words, it is very difficult to carry out such a process.

Tin presented in the electrodepositing coating layer takes both forms of organotin and inorganic tin. Our studies with respect to this reveal that data loss of a hard disk can be only attributed to organotin in the electrodepositing coating layer, and inorganic tin would not cause data loss. Therefore, it suffices to regulate the organotin content to a level of 50 ppm or even lower, thus rendering the electrodepositing coating process undemanding.

The method of coating a single electrodepositing coating layer over the spindle motor part of a HDD as per the patent No. CN1073754C is defective in that those sections of the part base that touch the electrode needles turn into pinholes, not covered by the electrodepositing coating layer and therefore exposed to the surrounding environment. Thus exposed base is directly subject to the environment, leading to corrosion and hence potential damages to the HDD.

DISCLOSURE OF THE INVENTION

Problems to be Solved by the Invention

An object of the invention is to provide a compositely coated spindle motor part of a hard disk driver without exposed pinholes and holes over the surface thereof, which imposes a low requirement on the purity of coating raw materials, renders the electrodepositing process undemanding, improves the bonding force between coating layers, and bears an excellent anti-corrosion property. Another object of the invention is to provide a composite coating method used for the compositely coated spindle motor part of a hard disk driver.

Means for Solving the Problems

An aspect of the present invention is to provide a compositely coated spindle motor part of a hard disk driver, comprising a motor part base and a composite coating coated thereover, with the composite coating composing an electrodepositing coating layer as an inner layer and a spraying coating layer as an outer layer; the electrodepositing coating layer contains tin, in both forms of organotin and inorganic tin, of a weight ratio from 60 ppm to 300 ppm, and the weight ratio of tin contained therein in form of organotin is not higher than 50 ppm; the spraying coating layer contains tin of a weight ratio not higher than 50 ppm.

The composite coating method used for the compositely coated spindle motor part of a hard disk driver according to the present invention comprises steps of:

A. coating an electrodepositing coating layer over the surface of the motor part base, after which baking is conducted at a temperature of 100° C.-150° C. for a period of 15-35 minutes;

B. spraying a spraying coating layer over the resultant outcome from the step A: first the motor part coated with the electrodepositing coating layer is primarily sprayed and baked, with baking being performed at a temperature of 100° C.-160° C. and lasting for a period of 5-20 minutes; then the motor part is turned over, secondarily sprayed and baked, with baking being performed at a temperature of 160° C.-190° C. and lasting for a period of 20-40 minutes.

In the above composite coating method as applied to the compositely coated spindle motor part of a HDD, for the purpose that the weight ratio of tin contained in the inner electrodepositing coating layer of the composite coating of the compositely coated spindle motor part of a HDD is between 60 ppm and 300 ppm and that the weight ratio of organotin is not higher than 50 ppm, the weight ratio of tin contained in the aqueous electrodepositing paint solution in the electrodepositing bath used in step A to coat an electrodepositing coating layer over the surfaces of the motor part base is between 12 ppm and 60 ppm, wherein the weight ratio of organotin is not higher that 10 ppm. For the purpose that the spraying coating layer contains tin of a weight ratio not higher than 50 ppm, the weight ratio of tin contained in the spraying paint used in step B for spraying coating is not higher than 25 ppm.

As for the composite coating method as employed in the present invention, it is worthwhile to noticing that the one-step electrodepositing coating process in step A and the two-step spraying coating process in step B characterize the composite coating method. Comprehensive technical studies conducted by the applicant show that the composite coating resulting from the three steps presents excellent bonding force and a complete covering over the motor part base such that the motor part bears an excellent holistic anti-corrosion property.

The patent No. CN1073754C attributes loss of storage contents in a hard disk to adherence of tin and its compound released from an electrodepositing coating layer to surfaces of the magnetic storage medium. Comprehensive studies conducted by the applicant show to the contrary that loss of storage contents in a hard disk is essentially caused by adherence of organotin resealed from the electrodepositing coating layer to the surfaces of a magnetic storage medium. Particularly, the melting point of organotin is quite low, and therefore organotin tends to be released from the coating layer when the inside temperature rises due to a long operation of the HDD. Released organotic is adhered to the surfaces of the magnetic storage medium, thus resulting in data loss. By the contrast, inorganic tin has a melting point of several hundred centigrades higher than that of organotin such that it will not be released to cause data loss. Accordingly, the present invention simply regulates the content of organotin in the electrodepositing coating layer to a level less than 50 ppm or even lower. In this way a high requirement on the material purity will be dispensed with, the control difficulty in the electrodepositing coating process will be alleviated, and no data loss will be caused.

The patent No. CN1073754C discloses a solution in which a spindle motor part of a HDD is coated with only one electrodepositing coating layer. In the electrodepositing process, the part to be coated has to touch electrodes, resulting in uncoated pinholes presented in the sections of the part touching the electrodes since the electrodepositing paint could not be deposited at these sections. Since these pinholes are directly subject to the surrounding environment, rust will occur such that the hard disk may be damaged. The present invention employed a composite coating to circumvent this problem. In particular, an electrodepositing coating layer is first coated over the base, and then a spraying coating layer is coated over the electrodeposited surface. The spraying coating layer can completely cover the pinholes arising in the electrodepositing process; furthermore no pinholes will present in the spraying process since during that process the part does not touch the electrodes. In this manner there will be no pinholes appearing in the resultant composite coating, which would otherwise expose the part base to the environment. Therefore the base is completely covered, resulting in an excellent holistic anti-corrosion property.

Further, studies conducted by the applicant reveal that the bonding force between the electrodepositing coating layer and the spraying coating layer can be enhanced if the content of tin, in the form of inorganic tin, in the electrodepositing coating layer is appropriately increased to the extent that the total tin content therein amounts to a range of 60 ppm to 300 ppm, provided that the electrodepositing coating layer is regulated to contain organotin at a level less than 50 ppm.

Effects of the Invention

An otherwise high requirement on the purity of electrodepositing coating materials is dispensed with since the content of tin in the electrodepositing coating layer of the motor part is increased due to inorganic tin generally presented in raw materials as impurity, and no negative effects are caused to the magnetic memory media. Meanwhile, the composite coating according to the invention covers the motor part completely and therefore eliminates exposed points over the surface thereof, such that it bears an excellent holistic anti-corrosion property.

A further description will be given hereinafter with reference to the accompanying drawings and the embodiments.

BRIEF DESCRIPTION OF THE DRAWINGS

The accompanying drawing (FIG. 1) shows in a locally cross-sectional view the schematic structure of a compositely coated spindle motor magnet of a HDD according to the invention.

REFERENCE NUMERALS 1 base
2 electrodepositing coating layer
3 spraying coating layer

PREFERRED EMBODIMENTS

Embodiment 1

Figure 1:
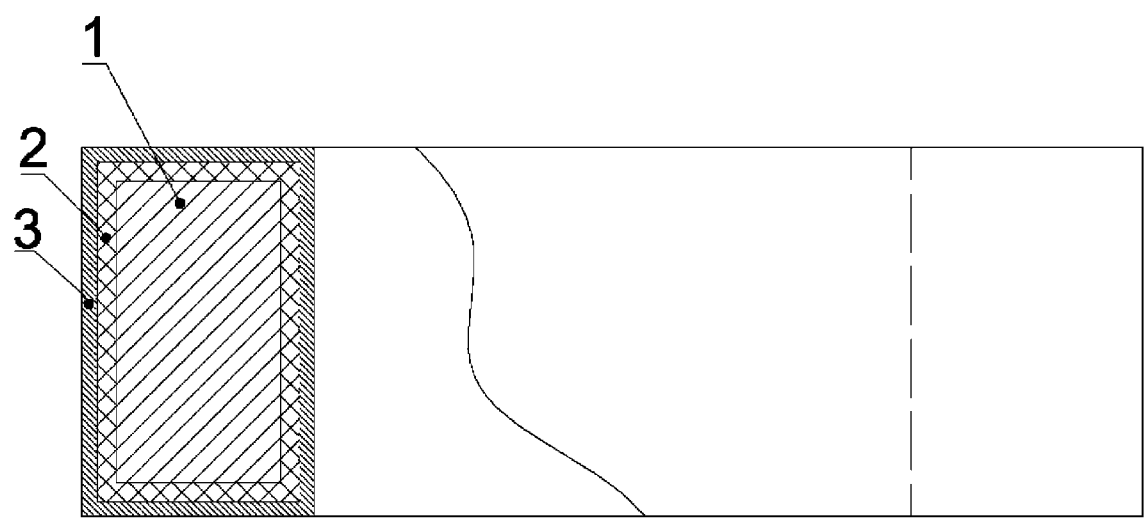

A compositely coated spindle motor magnet of a hard disk driver (HDD) comprises a motor magnet base 1 coated with a composite coating. The composite coating is comprised of an electrodepositing coating layer 2 as an inner layer and a spraying coating layer 3 as an outer layer. The electrodepositing coating layer 2 contains tin, in both forms of organotin and inorganic tin, of a weight ratio from 225 ppm to 300 ppm, and the weight ratio of tin contained therein in form of organotin is not higher than 50 ppm. The spraying coating layer 3 contains tin of a weight ratio from 26 ppm to 50 ppm.

A composite coating method used for the compositely coated spindle motor part of a hard disk driver comprises steps of:

A. coating an electrodepositing coating layer over the surface of the motor magnet base;

The aqueous electrodepositing paint solution used in the electrodepositing process contains tin of a weight ratio from 45 ppm to 60 ppm, wherein the weight ratio of organotin is not higher than 10 ppm such that the electrodepositing coating layer in the composite coating of the compositely coated spindle motor magnet of the HDD contains tin of a weight ratio from 225 ppm to 300 ppm, with the weight ratio of tin contained therein in form of organotin is not higher than 50 ppm.

A prior electrodepositing coating process is employed to coat the electrodepositing paint from the said aqueous electrodepositing paint solution over the motor magnet. After coated with the said the electrodepositing coating layer, the motor magnet base 1 is baked at a temperature of 100° C. for a period of 35 minutes.

B. spraying a spraying coating layer 3 over the resultant outcome from the step A;

The spraying paint used in spraying contains tin of a weight ratio of 13 ppm to 25 ppm such that the spraying coating layer 3 in the composite coating of the compositely coated spindle motor magnet of the HDD contains tin of a weight ratio from 26 ppm to 50 ppm.

A prior spraying coating process is employed to coat the above spraying paint over the motor magnet coated with the electrodepositing coating layer. First the motor magnet coated with the electrodepositing coating layer is primarily sprayed and baked, with baking being performed at a temperature of 100° C. and lasting for a period of 20 minutes; then the motor magnet is turned over, secondarily sprayed and baked, with baking being performed at a temperature of 160° C. and lasting for a period of 40 minutes.

Embodiment 2

A compositely coated spindle motor magnet of a hard disk driver comprises a motor magnet base 1 coated with a composite coating. The composite coating is comprised of an electrodepositing coating layer 2 as an inner layer and a spraying coating layer 3 as an outer layer. The electrodepositing coating layer 2 contains tin, in both forms of organotin and inorganic tin, of a weight ratio from 140 ppm to 225 ppm, and the weight ratio of tin contained therein in form of organotin is 30 ppm. The spraying coating layer 3 contains tin of a weight ratio not higher than 26 ppm.

A composite coating method used for the compositely coated spindle motor part of a hard disk driver comprises steps of:

A. coating an electrodepositing coating layer over the surface of the motor magnet;

The aqueous electrodepositing paint solution used in the electrodepositing process contains tin of a weight ratio from 28 ppm to 45 ppm, wherein the weight ratio of organotin is 6 ppm such that the inner electrodepositing coating layer in the composite coating of the compositely coated spindle motor magnet of the HDD contains tin of a weight ratio from 140 ppm to 225 ppm, with the weight ratio of tin contained therein in form of organotin is 30 ppm.

A prior electrodepositing coating process is employed to coat the electrodepositing paint from the said aqueous electrodepositing paint solution over the motor magnet. After coated with the said the electrodepositing coating layer, the motor magnet base 1 is baked at a temperature of 120° C. for a period of 25 minutes.

B. spraying a spraying coating layer 3 over the resultant outcome from the step A;

The spraying paint used in spraying contains tin of a weight ratio not higher then 13 ppm such that the spraying coating layer 3 in the composite coating of the compositely coated spindle motor magnet of the HDD contains tin of a weight ratio not higher then 26 ppm.

A prior electrodepositing coating process is employed to coat the electrodepositing paint from the above aqueous electrodepositing paint solution over the motor magnet. First the motor magnet coated with the electrodepositing coating layer is primarily sprayed and baked, with baking being performed at a temperature of 150° C. and lasting for a period of 10 minutes; then the motor magnet is turned over, secondarily sprayed and baked, with baking being performed at a temperature of 180° C. and lasting for a period of 30 minutes.

Embodiment 3

A compositely coated spindle motor magnet of a hard disk driver comprises a motor magnet base 1 coated with a composite coating. The composite coating is comprised of an electrodepositing coating layer 2 as an inner layer and a spraying coating layer 3 as an outer layer. The electrodepositing coating layer 2 contains tin, in both forms of organotin and inorganic tin, of a weight ratio from 60 ppm to 140 ppm, and the weight ratio of tin contained therein in form of organotin is 20 ppm. The spraying coating layer 3 contains tin of a weight ratio not higher than 20 ppm.

A composite coating method used for the compositely coated spindle motor part of a hard disk driver comprises steps of:

A. coating an electrodepositing coating layer over the surface of the motor magnet;

The aqueous electrodepositing paint solution used in the electrodepositing process contains tin of a weight ratio from 12 ppm to 28 ppm, wherein the weight ratio of organotin is 4 ppm such that the electrodepositing coating layer in the composite coating of the compositely coated spindle motor magnet of the HDD contains tin of a weight ratio from 60 ppm to 140 ppm, with the weight ratio of tin contained therein in form of organotin is 20 ppm.

A prior electrodepositing coating process is employed to coat the electrodepositing paint from the said aqueous paint solution over the motor magnet. After coated with the said the electrodepositing coating layer, the motor magnet base 1 is baked at a temperature of 150° C. for a period of 15 minutes.

B. spraying a spraying coating layer 3 over the resultant outcome from the step A;

The spraying paint used in spraying contains tin of a weight ratio not higher than 10 ppm such that the spraying coating layer 3 in the composite coating of the compositely coated spindle motor magnet of the HDD contains tin of a weight ratio not higher than 20 ppm.

A prior electrodepositing coating process is employed to coat the electrodepositing paint from the above aqueous electrodepositing paint solution over the motor magnet. First the motor magnet coated with the electrodepositing coating layer is primarily sprayed and baked, with baking being performed at a temperature of 160° C. and lasting for a period of 5 minutes; then the motor magnet is turned over, secondarily sprayed and baked, with baking being performed at a temperature of 190° C. and lasting for a period of 20 minutes.

Note specially that the above embodiments exemplify a compositely coated spindle motor magnet of a hard disk driver. It is obvious to the skilled in the art that the invention is not limited to this, and the inventive method can also be applied to other spindle motor parts, such as the laminated steel core of a HDD spindle motor.

We claim:

1. A compositely coated spindle motor part of a hard disk driver, comprising a motor part base (1), characterized in that,
    the base (1) is coated with a composite coating, with the composite coating composing an electrodepositing coating layer (2) as an inner layer and an spraying coating layer (3) as an outer layer;
    the electrodepositing coating layer (2) contains tin, in both forms of organotin and inorganic tin, of a weight ratio from 60 ppm to 300 ppm, and the weight ratio of tin contained therein in form of organotin is not higher than 50 ppm; and
    the spraying coating layer (3) contains tin of a weight ratio not higher than 50 ppm.

2. A composite coating method used for the compositely coated spindle motor part of a hard disk driver as claimed in claim 1, comprising steps of:
    A. coating an electrodepositing coating layer (2) over the surface of the motor part base (1), after which baking is conducted at a temperature of 100° C.-150° C. for a period of 15-35 minutes;
    B. spraying a spraying coating layer (3) over the resultant outcome from the step A: first the motor part coated with the electrodepositing coating layer is primarily sprayed and baked, with baking being performed at a temperature of 100° C.-160° C. and lasting for a period of 5-20 minutes; then the motor part is turned over, secondarily sprayed and baked, with baking being performed at a temperature of 160° C.-190° C. and lasting for a period of 20-40 minutes.

* * * * *